United States Patent
Happold et al.

(10) Patent No.: US 12,049,236 B2
(45) Date of Patent: Jul. 30, 2024

(54) COMPLEMENTARY CONTROL SYSTEM DETECTING IMMINENT COLLISION OF AUTONOMOUS VEHICLE IN FALLBACK MONITORING REGION

(71) Applicant: FORD GLOBAL TECHNOLOGIES, LLC, Dearborn, MI (US)

(72) Inventors: Michael Happold, Pittsburgh, PA (US); Ryan Skaff, Farmington Hills, MI (US); Derek Hartl, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 17/389,136

(22) Filed: Jul. 29, 2021

(65) Prior Publication Data

US 2023/0030815 A1     Feb. 2, 2023

(51) Int. Cl.
*B60W 60/00*     (2020.01)
*B60W 30/095*     (2012.01)

(52) U.S. Cl.
CPC ...... *B60W 60/0015* (2020.02); *B60W 30/095* (2013.01)

(58) Field of Classification Search
CPC ................. B60W 60/0015; B60W 30/095
USPC ........................................................ 701/23
See application file for complete search history.

(56) References Cited

U.S. PATENT DOCUMENTS

| | | | |
|---|---|---|---|
| 6,253,128 B1 * | 6/2001 | Kageyama | G05D 1/0272 701/25 |
| 7,630,807 B2 | 12/2009 | Yoshimura et al. | |
| 8,762,006 B2 | 6/2014 | Miller | |
| 9,368,026 B1 | 6/2016 | Herbach et al. | |
| 9,542,846 B2 | 1/2017 | Zeng et al. | |
| 9,604,585 B2 | 3/2017 | Joyce et al. | |
| 9,740,178 B2 | 8/2017 | Debouk et al. | |
| 9,862,364 B2 | 1/2018 | Fairfield | |

(Continued)

FOREIGN PATENT DOCUMENTS

WO     2018009552 A1     1/2018

OTHER PUBLICATIONS

International Search Report and Written Opinion issued Sep. 29, 2022, in International Application No. PCT/US22/74195 (11 pages).

(Continued)

*Primary Examiner* — Richard A Goldman
(74) *Attorney, Agent, or Firm* — Frank A. MacKenzie; Brooks Kushman P.C.

(57) ABSTRACT

Systems and methods for complementary control of an autonomous vehicle are disclosed. A primary controller provides a first plurality of instructions to an AV platform for operating the AV in an autonomous mode along a planned path based on sensor data from a primary sensor system and a secondary sensor system, and provides information that includes a fallback monitoring region to a complementary controller. The complementary controller receives sensor data from the secondary sensor system that includes sensed data for a fallback monitoring region, analyzes the received sensor data to determine whether a collision is imminent with an object detected in the fallback monitoring region, and cause the AV platform to initiate a collision mitigation action if a collision is determined to be imminent.

7 Claims, 9 Drawing Sheets

(56) References Cited

U.S. PATENT DOCUMENTS

| | | | |
|---|---|---|---|
| 9,892,332 B1 | 2/2018 | Wendel et al. | |
| 10,037,036 B2* | 7/2018 | Nilsson | B60W 30/143 |
| 10,059,335 B2* | 8/2018 | Newman | B60W 10/184 |
| 10,061,313 B2 | 8/2018 | Letwin et al. | |
| 10,688,990 B2* | 6/2020 | Kim | B60W 10/20 |
| 11,433,885 B1* | 9/2022 | Beller | B60W 30/095 |
| 2004/0030498 A1* | 2/2004 | Knoop | B62D 6/00 |
| | | | 340/436 |
| 2004/0088097 A1* | 5/2004 | Fujinami | B60T 13/686 |
| | | | 340/436 |
| 2005/0216181 A1* | 9/2005 | Estkowski | G08G 1/164 |
| | | | 340/995.23 |
| 2007/0288133 A1* | 12/2007 | Nishira | G05D 1/0246 |
| | | | 701/23 |
| 2009/0060273 A1 | 3/2009 | Stephan et al. | |
| 2009/0143951 A1* | 6/2009 | Takahashi | B60W 30/09 |
| | | | 701/70 |
| 2013/0282268 A1* | 10/2013 | Goerick | G08G 1/166 |
| | | | 701/301 |
| 2015/0057835 A1* | 2/2015 | Streubel | B60W 30/0953 |
| | | | 701/1 |
| 2015/0073638 A1* | 3/2015 | Van Kuilenburg | A01K 1/0128 |
| | | | 701/22 |
| 2017/0122742 A1* | 5/2017 | Schleicher | G05D 1/0212 |
| 2017/0166204 A1* | 6/2017 | Yoo | G08G 1/16 |
| 2017/0291473 A1* | 10/2017 | Kim | F25B 49/005 |
| 2017/0291602 A1* | 10/2017 | Newman | B60W 30/085 |
| 2018/0043887 A1* | 2/2018 | Newman | B60Q 9/008 |
| 2018/0290686 A1* | 10/2018 | Minoiu Enache | B62D 15/0265 |
| 2018/0373263 A1 | 12/2018 | Gray | |
| 2019/0126917 A1* | 5/2019 | You | B60T 7/22 |
| 2019/0315345 A1* | 10/2019 | Newman | B60W 50/14 |
| 2019/0329766 A1* | 10/2019 | Ishioka | B60W 30/0953 |
| 2020/0012873 A1* | 1/2020 | Kim | G06F 3/013 |
| 2020/0148201 A1 | 5/2020 | King et al. | |
| 2020/0174481 A1* | 6/2020 | Van Heukelom | |
| | | | B60W 60/0015 |
| 2020/0180615 A1* | 6/2020 | Yang | B60W 30/0953 |
| 2021/0082199 A1* | 3/2021 | Bonang | G06F 3/012 |
| 2021/0094589 A1 | 4/2021 | Sarett et al. | |
| 2021/0101620 A1* | 4/2021 | Buerkle | B60W 60/0015 |
| 2021/0114621 A1* | 4/2021 | Komuro | G08G 1/166 |
| 2021/0163039 A1* | 6/2021 | Iwamoto | B60W 60/007 |
| 2021/0229656 A1* | 7/2021 | Dax | G08G 1/09626 |
| 2021/0261159 A1* | 8/2021 | Pazhayampallil | G06V 10/25 |
| 2021/0291859 A1* | 9/2021 | Kido | B60W 30/095 |
| 2022/0097736 A1* | 3/2022 | Lin | B60W 60/00274 |
| 2022/0365530 A1* | 11/2022 | Foster | G05D 1/0022 |
| 2023/0111226 A1* | 4/2023 | Keller | G08G 1/167 |
| | | | 701/23 |

OTHER PUBLICATIONS

U.S. Appl. No. 16/817,708, filed Mar. 13, 2020, Using Rasterization to Identify Traffic Signal Devices.

U.S. Appl. No. 16/296,377, filed Mar. 8, 2019, Printer Head for Strand Element Printing.

Information about Related Patents and Patent Applications, see section 4 of the accompanying Information Disclosure Statement Letter, which concerns Related Patents and Patent Applications.

U.S. Appl. No. 17/389,121, filed Jul. 29, 2021, Complementary Control System for an Autonomous Vehicle.

* cited by examiner

COMPLEMENTARY CONTROL SYSTEM DETECTING IMMINENT COLLISION OF AUTONOMOUS VEHICLE IN FALLBACK MONITORING REGION

BACKGROUND

Autonomous vehicles (AV) are either developed to navigate and operate unmanned vehicles or to assist a vehicle operator, and can utilize many different types of sensors, automation, robotics, and other computer-controlled systems and mechanisms. Under existing technology, AVs can readily handle driving with other vehicles on roadways such as highways.

Safety is a concern of paramount importance greatly affecting the development and widespread adoption of AVs. This includes the safety of passengers and cargo within an AV, the safety of passengers and cargo in other vehicles (autonomous and human-controlled), pedestrians, property, and so forth. Even with today's advanced computing systems, errors can occur due to failure of one or more control units within the AV architecture.

Some AV systems employ one or more identical redundant controller systems that execute the same functions such that in case of failure of one controller, a redundant controller can take control. However, such redundancies in hardware and software for control systems result in increased system complexity, increased vehicle weight, and cost inefficiencies.

This document describes methods and systems that are directed to addressing the problems described above, and/or other issues.

SUMMARY

In various scenarios, systems and methods for complementary control of an autonomous vehicle are disclosed. The methods may include by a primary controller: receiving a first set of sensor data from a primary sensor system and a second set of sensor data from a secondary sensor system, providing a first plurality of instructions to an AV platform for operating the AV in an autonomous mode along a planned path based on the first set of sensor data and the second set of sensor data, and providing information that includes a fallback monitoring region to a complementary controller. The methods may also include by the complementary controller: receiving the second set of sensor data from the secondary sensor system, the second set of sensor data corresponding to the fallback monitoring region, analyzing the received second set of sensor data to determine whether a collision is imminent with an object detected in the fallback monitoring region, and upon determining that the collision is imminent with the object in the fallback monitoring region, causing the AV platform to initiate a collision mitigation action.

In some implementations, the primary controller may also analyze the second set of sensor data to detect presence of the object within the fallback monitoring region, and/or provide instructions to the AV platform for operating the AV in a manner that prevents or delays initiation of the collision mitigation action by the complementary controller.

In one or more implementations, the information may also include a region of inevitable intersection (ROII) within the fallback monitoring region. In such implementations, the complementary controller may analyze the received second set of sensor data to determine that the collision is imminent with the object in the fallback monitoring region upon determining that the object is present within the ROII This may include identifying intersections between the projected positions of the AV and the object in the ROII at various points of time. Optionally, the ROII may be calculated as a union of the AV's footprint over a left highest possible curvature trajectory and a right highest possible curvature trajectory at a current speed of the AV. Additionally and/or alternatively, the complementary controller may calculate a region of inevitable intersection (ROII) by truncating the ROLI.

In various implementations, the collision mitigation action may include a maximum braking action to bring the AV to a stop before it can collide with the object In some example implementations, the primary controller may provide the first plurality of instructions to the AV platform for operating the AV in the autonomous mode along the planned path by providing the first plurality of instructions to the AV platform via the complementary controller. Optionally, the complementary controller may stop provision of the first plurality of instructions to the AV platform received from the primary controller, upon determining that the collision is imminent with the object in the fallback monitoring region. Instead, the complementary controller may provide a second plurality of instructions to cause the AV platform to initiate the collision mitigation action.

In one or more implementations, the complementary controller may analyze the received second set of sensor data to determine whether the collision is imminent with the object in the fallback monitoring region only if the object has a threshold value associated with one or more characteristics of the object such as a weight, dimensions, and/or a density In some implementations, the secondary controller may continue monitoring the fallback monitoring to detect one or more other objects upon determining that the collision is not imminent with the object in the fallback monitoring region In various scenarios, systems and methods for complementary control of an autonomous vehicle are disclosed. The methods may include by a primary controller: receiving a sensor data from a primary sensor system of the AV, providing a first plurality of instructions to an AV platform for operating the AV in an autonomous mode along a planned path based on the received sensor data, and providing information to a complementary controller, the information comprising a fallback monitoring region and a failsafe trajectory, wherein the failsafe trajectory when followed by the AV will bring the AV safely to a stop within the fallback monitoring region. The methods further include, by the complementary controller causing the AV platform to initiate a failover stop action to bring the AV to a stop by following the failsafe trajectory, in response to detecting occurrence of a triggering event. The failsafe trajectory may bring the AV to a stop along the planned path.

In some example implementations, the primary controller may provide the first plurality of instructions to the AV platform for operating the AV in the autonomous mode along the planned path by providing the first plurality of instructions to the AV platform via the complementary controller. Optionally, the complementary controller may stop provision of the first plurality of instructions to the AV platform received from the primary controller, upon determining that the collision is imminent with the object in the fallback monitoring region. Instead, the complementary controller may provide a second plurality of instructions to cause the AV platform to initiate the collision mitigation action.

Optionally, the primary controller determines the failsafe trajectory based on, for example, a current state of the AV, one or more constraints relating to allowed deceleration of the AV, a number of objects in the environment of the AV, states of one or more objects in the environment of the AV, environmental conditions, characteristics of the planned path, a distance to an edge of a driveable surface, a distance to an opposing traffic lane and/or a distance from the planned path of the AV.

Optionally, the triggering event may include, for example, loss of communication between the primary controller and the primary sensor system, power failure of the primary controller; internal faults in the primary controller, loss of communication between the primary controller and the AV platform, loss of power to the AV platform; a primary controller failure, and/or an AVP failure.

In some implementations, the methods may also include detecting the occurrence of a triggering event based on information received from, for example, a diagnostics system configured to monitor health of the primary controller and/or a diagnostics system configured to monitor health of the AV platform.

The complementary controller, in some example implementations may receive a plurality of failsafe trajectories from the primary controller, and select one of the plurality of failsafe trajectories as a trajectory for the failover stop action in response to detecting occurrence of the triggering event. Optionally, the complementary controller may select the the trajectory for the failover stop action by monitoring the fallback monitoring region, and discarding one or more of the plurality of failsafe trajectories in response to detecting an object in the fallback monitoring region that intersects with the one or more of the plurality of failsafe trajectories. Additionally and/or alternatively, the complementary controller may discard one or more of the plurality of failsafe trajectories that were not received from the primary controller within a threshold time before detection of the occurrence of the triggering event. Each of the received failsafe trajectories may, optionally, be associated with a score, and the failsafe trajectory associated with the best score may be selected for the failover stop action.

In some implementations, the complementary controller may initiate a collision mitigation action in response to detecting an object in the failsafe trajectory upon initiation of the failover stop action to bring the AV to the stop by following the failsafe trajectory. In such implementations, the complementary controller may detect the object in the failsafe trajectory based on data received from a secondary sensor system.

In various scenarios, systems and methods for complementary control of an autonomous vehicle are disclosed. The methods may include by a primary controller: receiving a first set of sensor data from a primary sensor system and a second set of sensor data from a secondary sensor system, providing a first plurality of instructions to an AV platform for operating the AV in an autonomous mode along a planned path based on the first set of sensor data and the second set of sensor data (via a complementary controller), determining information that includes a fallback monitoring region and a plurality of failsafe trajectories corresponding to a current status of the AV, and providing the determined information to the complementary controller to enable it to control operations of the AV upon occurrence of a triggering event without reliance on the first plurality of instructions. Optionally, the plurality of failsafe trajectories may be located within the fallback monitoring region.

The methods may also include calculating a region of inevitable intersection (ROII) within the fallback monitoring region, and providing the calculated ROII to the complementary controller. Optionally, the ROII may be calculated as a union of the AV's footprint over a left highest possible curvature trajectory and a right highest possible curvature trajectory at a current speed of the AV. Additionally and/or alternatively, the ROLI may be calculated as a union of planned AV footprints over a next N seconds.

In some implementations, the methods may also include, by the primary controller, determining the fallback monitoring region as a union of swept areas of one or more trajectories of the AV.

The plurality of failsafe trajectories may be determined based on, for example, current speed of the AV, current acceleration of the AV, constraints relating to deceleration of the AV, heading of the AV, objects in the AV's environment and information relating to the objects, environmental conditions, information relating to the planned path, and/or or information relating to a surrounding environment of the AV. Optionally, the plurality of failsafe trajectories may be determined such that they follow the planned path and bring the AV to a safe stop within a certain distance from a current position of the AV. Additionally and/or alternatively, a score may be assigned to each of the plurality of failsafe trajectories that is indicative of a quantitative metric associated with a failsafe trajectory.

In some implementations, the methods may include mimicking operations of the secondary controller by analyzing the second set of sensor data and information received from the secondary controller, and providing instructions to the AV platform for operating the AV in a manner that prevents or delays initiation of a collision mitigation action by the complementary controller.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

The following disclosure describes a primary controller for controlling the operations of an AV under normal operating conditions. The disclosure further describes a complementary controller that is configured to take over guidance of the AV from the primary controller and control the operations of the AV itself to perform collision mitigation and/or upon occurrence of a failure or other triggering event (as described below), without immediate intervention from a human driver.

Figure 1:
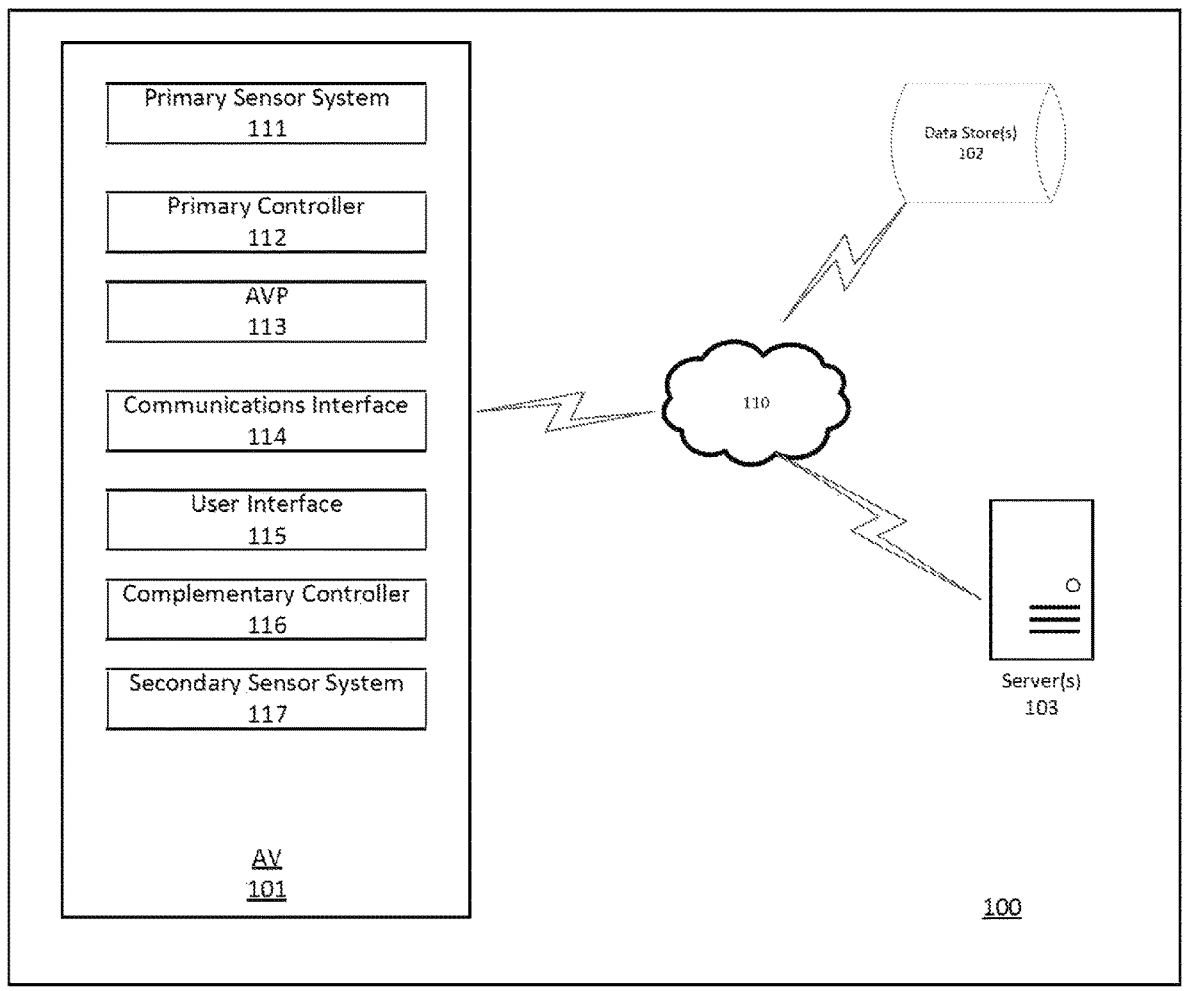
FIG. 1 illustrates an example system that includes an autonomous vehicle.

FIG. 1 is a block diagram illustrating an example system 100 that includes an AV 101 in communication with one or more data stores 102 and/or one or more servers 103 via a network 110. Although there is one AV shown, multiple AVs may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the AV 101 may include a primary sensor system 111 in communication with a primary controller 112 and a secondary sensor system 117 in communication with a complementary controller 116 and/or the primary sensor system 111. The primary controller 112 and/or the complementary controller 116 may transmit control instructions to an AV platform (AVP) 113 for controlling navigation of the AV in an autonomous mode. The AVP 113 may navigate the AV in accordance with the received instructions to, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers. Some or all of these components may be controlled by the AVP 113 using a variety of communication signals and/or commands, such as, for example, acceleration signals or commands, deceleration signals or commands, steering signals or commands, braking signals or commands, etc.

The AV 101 may also include a communications interface 114, a user interface 115, and certain components (not shown here) included in vehicles, such as, an engine, wheels, steering wheel, transmission, etc. The communications interface 114 may be configured to allow communication between AV 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface 115 may be part of peripheral devices implemented within vehicle 101 including, for example, a keyboard, a touch screen display device, a microphone, and a speaker, etc.

The primary sensor system 111 and/or the secondary sensor system 117 may include one or more sensors that are coupled to and/or are included within the AV 101. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), inertial timing modules (ITM), etc.), humidity sensors, occupancy sensors, or the like. The sensor data can include information that describes the location of objects within the surrounding environment of the AV 101, information about the environment itself, information about the motion of the AV 101, information about a route of the AV, or the like. In certain embodiments, the primary sensor system 111 includes at least the following sensor systems: a LiDAR sensor, a RADAR sensor, and/or a camera. In some embodiments, the secondary sensor system 117 includes at least the following sensor systems: a LiDAR sensor, a RADAR sensor, and/or an ITM sensor.

Figure 2:
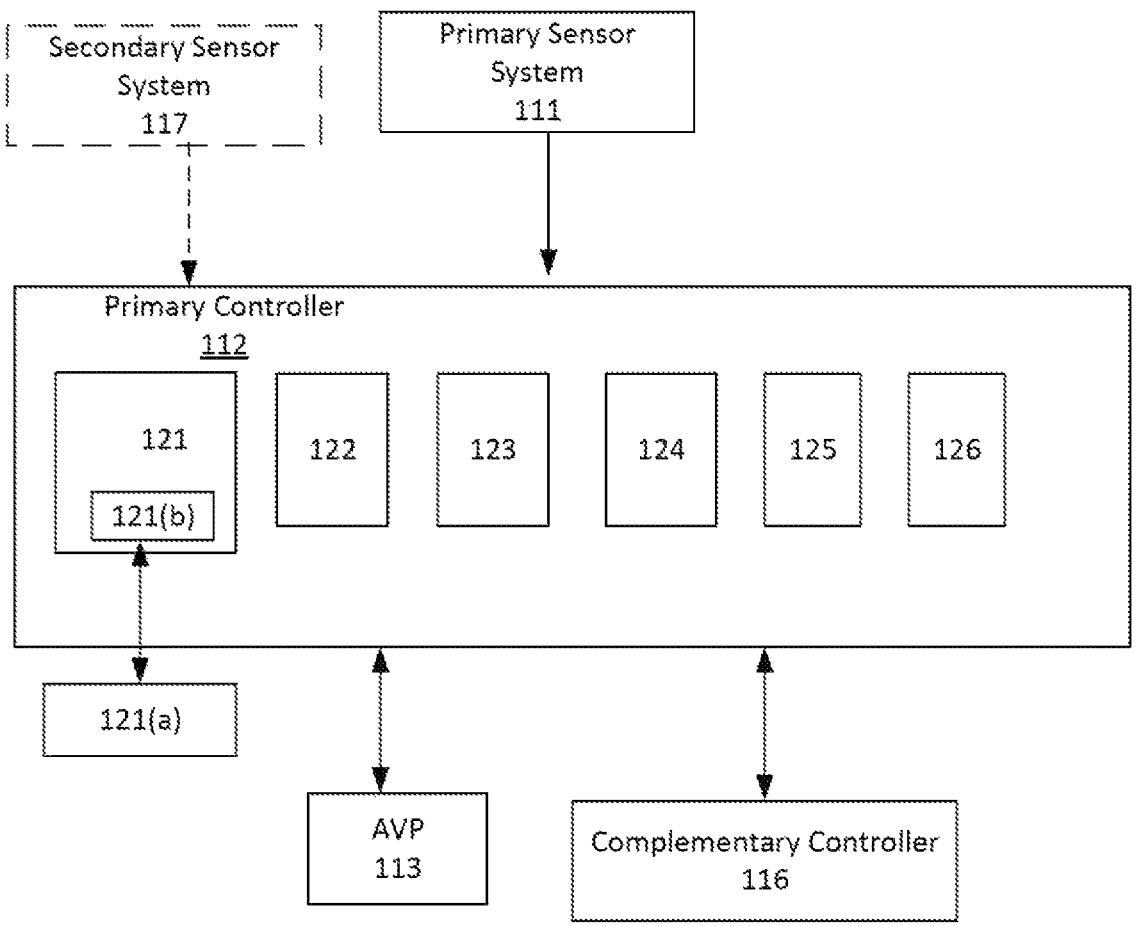
FIG. 2 illustrates a block diagram of various components of an example primary controller of an autonomous vehicle.

Referring now to FIG. 2, the primary controller 112 may receive data collected by the primary sensor system 111 and analyze it to provide one or more vehicle control instructions to the AVP 113. Optionally, the primary controller 112 may also receive sensor data collected by the secondary sensor system 117, and use the secondary sensor data in providing vehicle control instructions to the AVP 113.

The primary controller 112 may include, without limitation, a localization subsystem 121, a perception subsystem 122, a forecasting and prediction subsystem 123, and a motion planning subsystem 124. In certain embodiments, the primary controller 112 may also include a fail operational subsystem 125 and a primary diagnostics subsystem 126. The components of the primary controller 112 (localization subsystem 121, perception subsystem 122, forecasting and prediction subsystem 123, motion planning subsystem 124, primary diagnostics subsystem 126, and fail operational subsystem 125) may be a processing device and programming instructions that are configured to cause the processing device to perform the functions of the subsystems as described in this document. While the current disclosure shows the components as separate parts of the primary controller 112, two or more of the subsystems may share a single processing device.

A localization subsystem 121 may obtain, retrieve, and/or create map data that provides detailed information about the surrounding environment of the AV. The localization subsystem 121 may also determine the location, orientation, pose, etc. of the AV in the environment (localization) based on, for example, three dimensional position data (e.g., data from a GPS), three dimensional orientation data, predicted locations, or the like. For example, the localization subsystem 121 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The map data may include information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that the primary controller 112 can use in analyzing the surrounding environment of the AV. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined, such as the centerline of the traffic lanes. Optionally, the reference path may be generated based on a historical observations of vehicles or other objects over a period of time (e.g., reference paths for straight line travel, lane merge, a turn, or the like).

In certain embodiments, the localization subsystem 121 may also include and/or may receive information relating to the trip or route of a user, real-time traffic information on the route, or the like.

The localization subsystem 121 may include and/or may be in communication with a routing module 121(b) that generates a navigation route from a start position to a destination position for an AV. The routing module 112(b) may access the map data store 121(a) to identify possible routes and road segments that a vehicle can travel on to get from the start position to the destination position. The routing module 112(b) may score the possible routes and identify a preferred route to reach the destination. For example, the routing module 112(b) may generate a navigation route that minimizes Euclidean distance traveled or other cost function during the route, and may further access the traffic information and/or estimates that can affect an amount of time it will take to travel on a particular route. Depending on implementation, the routing module 112(b) may generate one or more routes using various routing methods, such as Dijkstra's algorithm, Bellman-Ford algorithm, or other algorithms. The routing module 112(b) may also use the traffic information to generate a navigation route that reflects expected conditions of the route (e.g., current day of the week or current time of day, etc.), such that a route generated for travel during rush-hour may differ from a route generated for travel late at night. The routing module 112(b) may also generate more than one navigation route to a destination and send more than one of these navigation routes to a user for selection by the user from among various possible routes.

A perception subsystem 122 may determine perception information of the surrounding environment of the AV. Based on the sensor data provided by primary sensor system 111 and/or secondary sensor subsystem 117 and information obtained by the localization subsystem 121, the perception subsystem 122 may determine perception information of the surrounding environment of the AV 101. The perception information may represent what an ordinary driver would perceive in the surrounding environment of a vehicle. The perception data may include information relating to one or more objects in the environment of the AV 101. For example, the perception subsystem 122 may process sensor data (e.g., LiDAR or RADAR data, camera images, etc.) in order to identify objects and/or features in the environment of AV. The objects may include traffic signals, road way boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

A prediction subsystem 123 may predict future locations, trajectories, and/or actions of one or more objects. For example, the prediction subsystem 123 may predict the future locations, trajectories, and/or actions of the objects based at least in part on perception information (e.g., the state data for each object) received from the perception subsystem 122, the information received from the localization subsystem 121, the sensor data, and/or any other data that describes the past and/or current state of the objects, the AV 101, the surrounding environment, and/or their relationship(s). For example, if an object is a vehicle and the current driving environment includes an intersection, prediction subsystem 123 may predict whether the object will likely move straight forward or make a turn. If the perception data indicates that the intersection has no traffic light, prediction subsystem 123 may also predict whether the vehicle may have to fully stop prior to enter the intersection.

A motion planning subsystem 124 may determine a motion plan for the AV. For example, the motion planning subsystem 124 may determine a motion plan for the AV based on the perception data and/or the prediction data; in order to reach a desired destination location. Specifically, given predictions about the future locations of proximate objects and other perception data, the motion planning subsystem 124 can determine a motion plan for the AV 101 that best navigates the AV 101 relative to the objects at their future locations.

In one or more embodiments, the motion planning subsystem 124 may receive the predictions from the prediction subsystem 123 and make a decision regarding how to handle objects in the environment of the AV 101. For example, for a particular object (e.g., a vehicle with a given speed, direction, turning angle, etc.), motion planning subsystem 124 decides whether to overtake, yield, stop, and/or pass based on, for example, traffic conditions, map data, state of the AV, etc. Furthermore, the motion planning subsystem also plans a path for the AV 101 to travel on a given route, as well as driving parameters (e.g., distance, speed, and/or turning angle). That is, for a given object, the motion planning subsystem 124 decides what to do with the object and determines how to do it. For example, for a given object, the motion planning subsystem 124 may decide to pass the object and may determine whether to pass on the left side or right side of the object (including motion parameters such as speed). The motion planning subsystem 124 may also assess the risk of a collision between a detected object and the AV 101. If the risk exceeds an acceptable threshold, it may determine whether the collision can be avoided if the AV follows a defined vehicle trajectory and/or implements one or more dynamically generated emergency maneuvers is performed in a pre-defined time period (e.g., N milliseconds). If the collision can be avoided, then the primary controller 112 may transmit appropriate control instructions to the AV platform 113 for execution to perform a cautious maneuver (e.g., mildly slow down, accelerate, change lane, or swerve). In contrast, if the collision cannot be avoided, then the primary controller 112 may transmit appropriate control instructions to the AV platform 113 for execution of an emergency maneuver (e.g., brake and/or change direction of travel).

As discussed above, planning and control data regarding the movement of the AV is generated by the motion planning subsystem 124 of the primary controller 112 that is transmitted to the AV platform 113 for execution.

In certain embodiments, the motion planning subsystem 124 may also determine one or more failover trajectories. A failsafe trajectory is a trajectory that the AV may follow to come to a complete stop safely upon occurrence of a failover event, and is determined based on the vehicle dynamics, environmental factors, and perception and prediction data, etc. (described below in more detail).

The fail operational subsystem 125 may provide various information to the complementary controller 116. For example, the fail operational subsystem 125 may identify and/or receive from other components information such as a fallback monitoring region, one or more failover trajectories, a score associated with each failsafe trajectory, etc., and transmit the information to the complementary controller 116 (as discussed below).

A fallback monitoring region (shown in FIG. 4) is a polygon 401 along the planned path (i.e., a path the AV intends to follow in the immediate future, for example, within the next 5 seconds, 10 seconds 15 seconds, or the like), determined as a union of swept areas of one or more trajectories. As used herein, a swept area is the region along a path the AV' geometry would sweep out—i.e., the area filled by the AVs geometry when the geometry is moved continuously along a path. For example, for an average deceleration of 0.41 g on a wet surface, the fallback monitoring region may be determined as the AV volume projected along the AVs current path and tapering off past the 0.3 g stopping distance of the vehicle from 45 mph (i.e., 0.3 g deceleration=70-90 m stopping distance when starting from 45 mph speed). Typically, the failover trajectories are contained within the fallback monitoring region. The fallback monitoring region, the vehicle path, and the failsafe trajectories may be specified in the frame of reference of the AV at their respective times, and transmitted to the complementary controller 116. Each failsafe trajectory will include a path and corresponding time elements by which the AV will safely reach a target location and/or speed (e.g., come to a stop) from its present location.

The fallback monitoring region 401 may include a region of inevitable intersection (ROII) 403. In some embodiments, the ROII 403 may be determined as a union of the vehicle footprint over the highest possible curvature trajectories (left trajectory 411 and right trajectory 412) at the current vehicle speed. In other words, the ROII 403 represents an area within which entry of an object would lead to inevitable collision with the AV 400. For illustration purposes, an object 432 may be present in the ROII 403.

Figure 4:
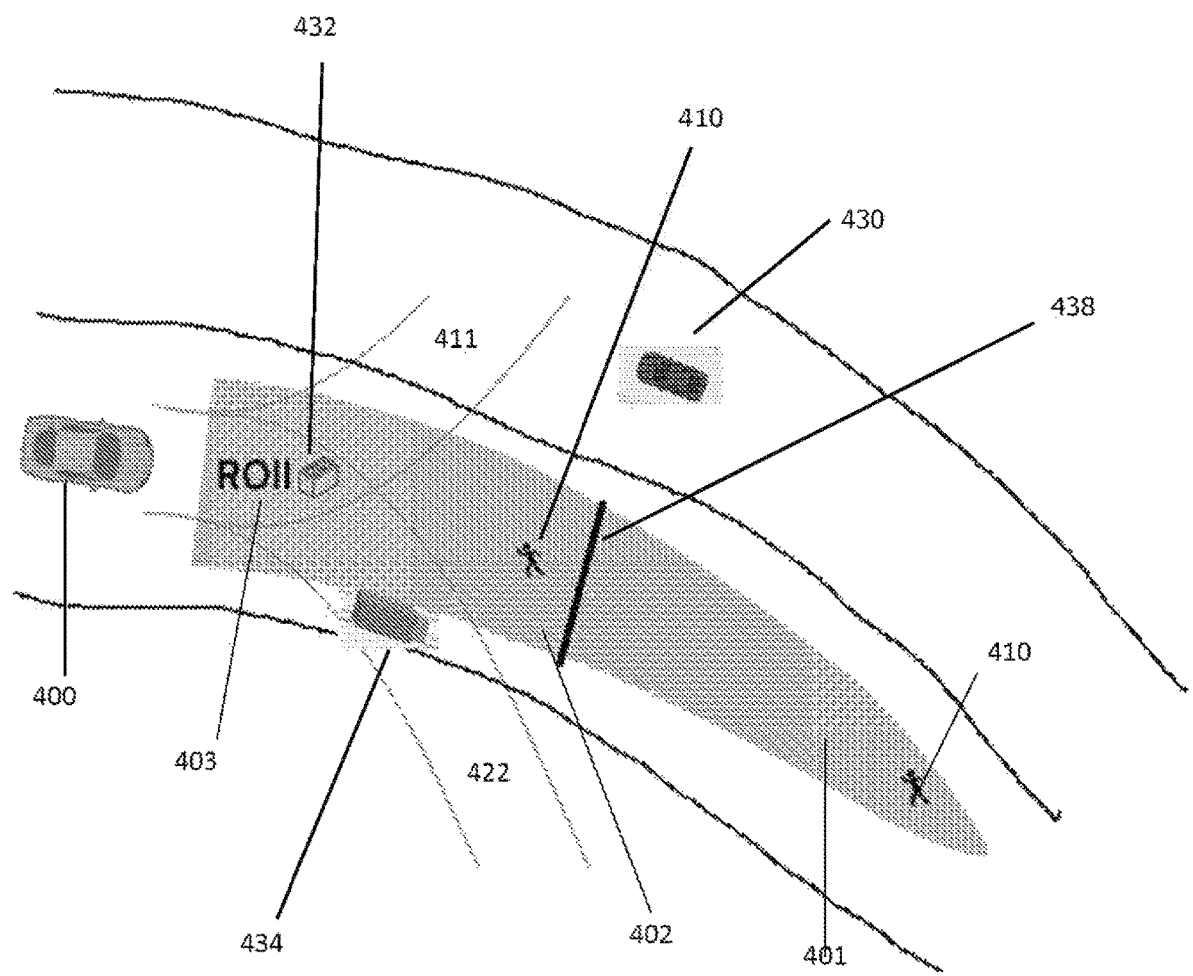
FIG. 4 illustrates a schematic illustration of an example failsafe monitoring region.

In certain other embodiments, the fallback monitoring region 401 may include a region of likely intersection (ROLI) 402 determined as a combination or union of planned AV footprints over the next N seconds. In other words, the ROLI 402 is determined based on the planned trajectory of the AV over the next N seconds and the AV's footprint for following the planned trajectory. As illustrated in FIG. 4, the ROLI 402 is closer to the vehicle 400 and separated from the farther part of the fallback monitoring region 401 by a solid line 438. FIG. 4 also illustrates an oncoming vehicle 430 in the oncoming lane and a parked vehicle 434 parked immediately next to the fallback monitoring region 401.

The fail operational subsystem 125 may transmit information relating to the failover trajectories, fallback monitoring region 401, the ROII 403, and/or the ROLI 402 to the complementary controller 116. Such information may be transmitted at a frequency of about 5-15 Hz, about 6-14 Hz, about 7-13 Hz, about 8-12 Hz, about 9-11 Hz, about 8 Hz, about 9 Hz, about 10 Hz, about 11 Hz, or the like.

The primary diagnostics subsystem 126 may monitor the health of the primary controller 112, such as without limitation, power supply; memory consistency; health of various communication interfaces (e.g., with sensor systems, AVP etc. checked using counter, checksum, missing messages, or the like); lateral and longitudinal plausibility; path(s) and fallback monitoring region rationality, capability status, arbitration health, sensor heath data including quality and frequency of data supplied. The primary diagnostics subsystem 126 may also monitor for issues in the AVP 113 such as health status, power status, communications health, capability status, arbitration health, etc. Optionally, the AVP may include its own diagnostics system.

In certain embodiments, the primary controller 112 may also include a replica subsystem (not shown here) configured to replicate the functionality of the complementary controller 116 (described below) based on data received from the secondary sensor system 117 only (and/or the secondary sensory system 117). A non-faulty primary controller 112 has more capability to handle a fault condition compared to a secondary sensor system 117. To leverage this superior functionality, the replica subsystem is used to identify potential triggering of guidance of the AV being taken over the complementary controller 116, in advance of actual occurrence of such an event. This allows the primary controller 112 to avoid potential false positive triggers by giving the complementary controller 116 more time or by choosing an alternative plan (path).

The primary controller 112 may receive information such as secondary sensor system data, local pose as computed by the complementary controller 116, collision monitor status, vehicle speed, log data, or the like, from the complementary controller 116. Optionally, the primary controller 112 may receive the secondary sensor data directly from the secondary sensor system 117. Based on such information received from the complementary controller 116 (and/or the secondary sensory system 117), the replica subsystem may monitor objects in the fallback monitoring region and take actions to avoid potential false positive triggers. For example, as shown in FIG. 4, when an object 410 enters the fallback monitoring region 401 at a location that is outside the ROLI 402, the primary controller 112 may start monitoring the object 410. When the object enters the ROLI 402, the replica subsystem may provide instructions to decelerate the AV 400 and/or change the motion path of the AV 400 so as to delay or avoid entry of the object 410 within the ROII 403 which will trigger collision mitigation actions by the complementary controller 116 (described below). The rate of deceleration and/or the new motion path may be determined and varied in real-time based on factors such as, without limitation, the distance of the object 410 from the AV 400, speed/acceleration of the AV 400, speed/acceleration of the object 410, heading or orientation of the AV 400, heading or orientation of the object 410, type of the object, predictions relating to one or more future actions of the object 410, environmental conditions (e.g., wet roads, approaching an intersection or a traffic light, low visibility, etc.), characteristics of the planned motion path (e.g., approaching a turn signal), or the like. Once the object enters the ROII 403, collision mitigation may be initiated by the complementary controller 116 as described below.

In certain embodiments, the primary controller 112 may provide instructions to the AVP 113 for execution directly. Examples of such instructions may include, without limitation, motion and planning commands (e.g., torque, steering, gear position, etc.), external communications with road users (e.g., turn signals, horn, hazards, etc.), headlamp commands, status information (i.e., information relating to the current performance of the AV), or the like. Optionally, the primary controller 112 may provide at least some of the instructions to the AVP 113 for execution, via the complementary controller 117. Examples of such instructions may include, without limitation, motion and planning commands (e.g., torque, steering, gear position, etc.), external communications with road users (e.g., turn signals, horn, hazards, etc.), headlamp commands, status information (i.e., information relating to the current performance of the AV), mode information (i.e., whether the AV is operating in an autonomous mode, semi-autonomous mode, or in a user controlled mode), or the like.

Referring back to FIG. 1, the system 100 also includes a complementary controller 116 configured to take over guidance of the AV under certain scenarios (i.e., upon occurrence of a triggering event). As discussed above, the complementary controller 116 may receive data collected by the secondary sensor system 117 and analyze it to provide one or more vehicle control instructions to the AVP 113. It should be noted that while the complementary controller 116 does not receive sensor data from the primary sensor system 111, it may transmit data from the secondary sensor system 117 to the primary controller 112.

Figure 3:
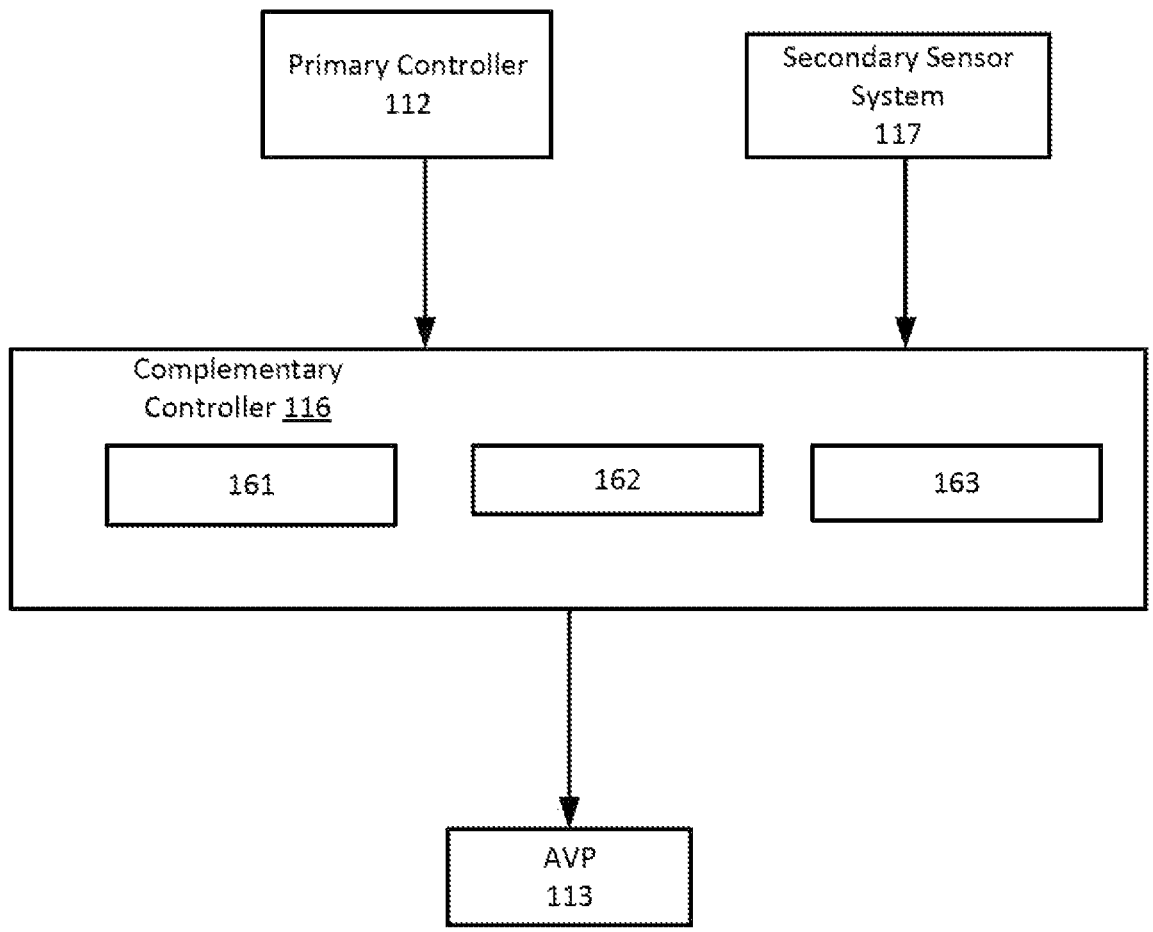
FIG. 3 illustrates block diagram of various components of an example complementary controller of an autonomous vehicle.

FIG. 3 illustrates an example complementary controller 116 according to an embodiment. As illustrated by FIG. 3, a complementary controller 116 may include one or more subsystems that are responsible for performing one or more types of tasks or functions such as without limitation, a collision mitigation subsystem 161, a failover subsystem 162, and a secondary diagnostics subsystem 163. The components of the complementary controller 116 may be a processing device and programming instructions that are configured to cause the processing device to perform the functions of the subsystems as described in this document. While the current disclosure shows the components as separate parts of the complementary controller 116, two or more of the subsystems may share a single processing device.

As discussed above, under normal operating conditions, the complementary controller 116 may pass instructions from the primary controller 112 to the AVP 113 for execution. However, under certain conditions (inevitable collision with object in ROII and/or upon occurrence of a triggering event), the complementary controller 116 may stop passing the primary controller 112 instructions, and may instead provide its own instructions (collision mitigation or failsafe trajectory) to the AVP 113 for execution.

The complementary controller 116 may also receive various real-time information from the primary controller 112 such as, without limitation, information relating to the fallback monitoring region 401, information relating to the ROII 402, information relating to the ROLI 403, global pose of the AV, current motion path of the AV (e.g., route, trajectory, etc.), information relating to one or more failover trajectories, or the like. In certain embodiments, the complementary controller 116 may determine the ROII 402 based on the ROLI 403. The complementary controller may use information received from the primary controller 112 and/or the secondary sensor system 117 to perform one or more of its functions.

Referring now to FIG. 3, the collision mitigation subsystem 161 may analyze the vehicle location and the fallback monitoring region to determine if there are any objects present within the fallback monitoring region. If such objects are present, the collision mitigation subsystem 161 may monitor the objects and initiate a collision mitigation action (discussed below in more detail) if an object enters a ROII 402 shown in FIG. 4 and is predicted to lead to an inevitable collision.

Figure 5:
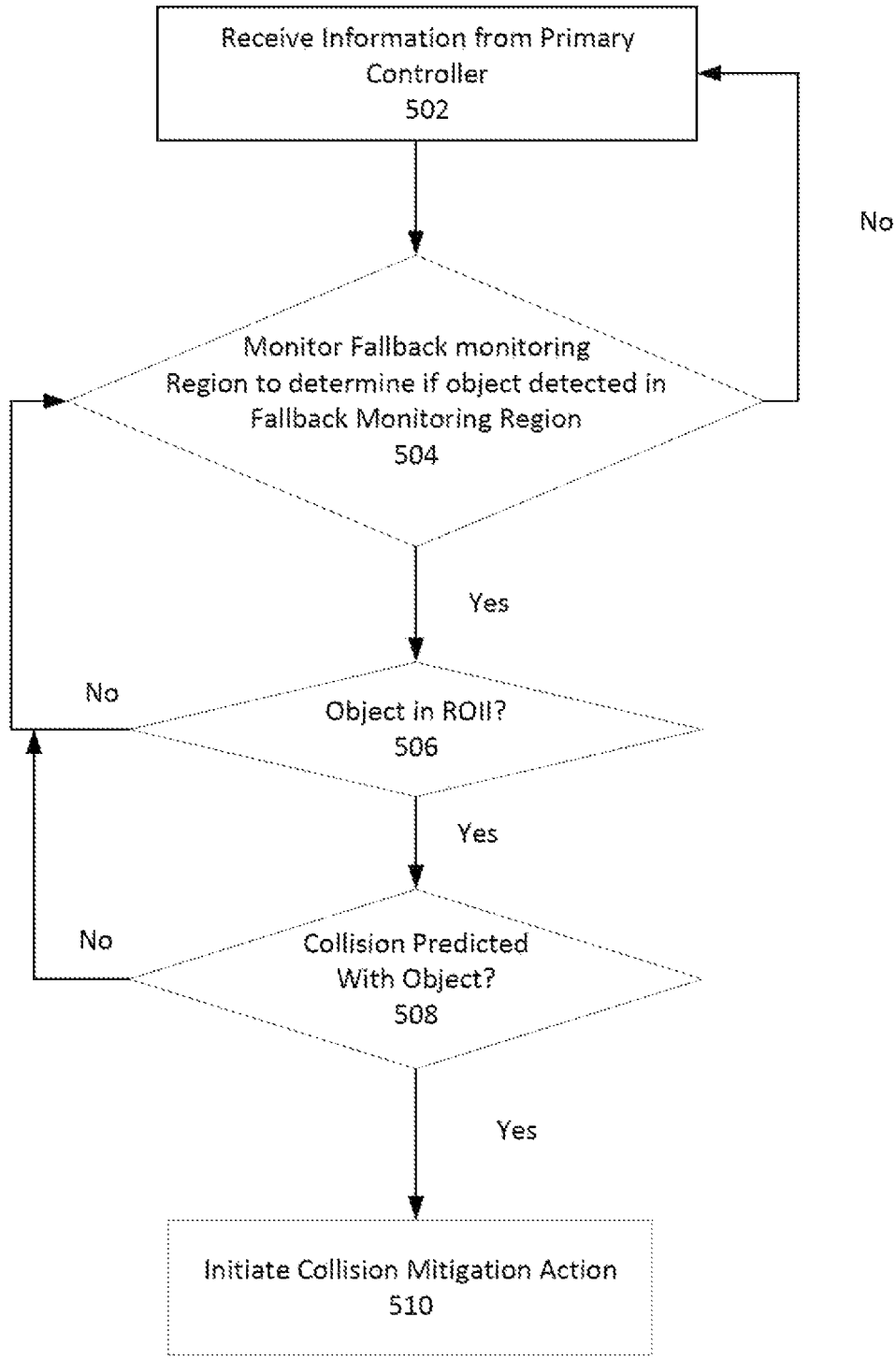
FIG. 5 is a flowchart illustrating an example method for execution of collision mitigation by a complementary controller.

FIG. 5 is a flowchart illustrating an example method for execution of collision mitigation by a complementary controller. At 502, the complementary controller may receive information including the fallback monitoring region, and the ROLI and/or ROII. As discussed above, the complementary controller may receive information relating to the fallback monitoring region and the ROII from the primary controller. Alternatively, the complementary controller 116 may receive information relating to the fallback monitoring region and the ROLI from the primary controller, and may determine the ROII by truncating the ROLI based on a stopping distance required for the AV. The stopping distance is a distance along the ROLI that the complementary controller needs to take into account because its action is to bring the AV to a stop (for example, a safe stopping distance based on maximum braking power of the AV). It should be noted that the fallback monitoring region, the ROLI and the ROII are continuously updated and provided to the complementary controller, as the AV follows a path.

At 504, the complementary controller may use sensor data received from the secondary sensor system to monitor the fallback monitoring region in real-time and determine if there is an object present within the fallback monitoring region. The complementary controller may use the received sensor data to determine perception information within the fallback monitoring region which may be used to determine if there are any objects present within the fallback monitoring region. For example, the complementary controller may process sensor data (e.g., LiDAR or RADAR data, camera images, etc.) in order to detect objects and/or features in the fallback monitoring region. The objects may include traffic signals, road way boundaries, other vehicles, pedestrians, and/or obstacles, etc. The complementary controller may use any now or hereafter known algorithms for determining the perception information.

For an object is detected within the fallback monitoring region, the complementary controller may also determine, for the detected object in the fallback monitoring region, the current state of the object. The state information may include, without limitation, for each object: current location; current speed and/or acceleration, current heading; current pose; current shape, size, or footprint; type (e.g., vehicle, pedestrian, bicycle, static object, obstacle); and/or other state information.

If an object is detected within the fallback monitoring region (504: YES), the complementary controller may determine whether the object is located within the ROII (506). As discussed above, the complementary controller may determine the state of the objects detected within the fallback monitoring region that includes the current location and can be used to determine whether the object is in the ROII. If the detected object is not in the ROII (506: NO) or if no object is detected in the fallback monitoring region (504: NO), the complementary controller may continue receiving sensor data (502) and monitoring the fallback monitoring region and/or the detected object (step 504). Optionally, the system may also perform detection, tracking, and prediction (by, for example, monitoring a region outside the ROII) to predict if a detected object is going to enter the ROII within a threshold time.

However, if the detected object is in the ROII (506: YES), the complementary controller may determine whether a collision is predicted between the object in the ROII and the AV (508). Specifically, the complementary controller may use the perception information relating to the object and check for intersections between the projected positions of the AV and the object in the ROII at given points of time to determine if a collision is predicted. For example, a collision may not be predicted for an object in front of the AV that is traveling at a speed greater than or equal to that of the AV within the ROII unless it suddenly stops, when an object makes an unprotected left/right/or straight in the intersection without a risk of collision, or the like.

On the other hand collision may be predicted in scenarios such as when a vehicle makes an unplanned left turn or U-turn within an intersection with a traffic signal and is within the ROII or predicted to be within the ROII; when a vehicle makes an unprotected left turn, right turn, or straight in an intersection; when a vehicle makes an unprotected left turn, right turn, or straight in an intersection with cross traffic (e.g. missed oncoming vehicle); when a vehicle suddenly merges into traffic and within the ROII; when the AV is merging into traffic and an object appears in the ROII; when a vehicle makes a lane change and within the ROII; when the AV is making a lane change and an object appears in the ROII; when an object is revealed late (i.e., already in ROII); when approaching an area of occlusion; when a lead vehicle cuts-in and is within the ROII; when a vehicle making a high angle turn and/or U-turn and is within the ROII or predicted to be within the ROII; sudden appearance of cross traffic; or the like.

For determining projected positions of the AV, the complementary controller may first determine real-time location and pose of the AV within the fallback monitoring region (localization), and use the real-time location and pose in association with the speed of the AV to determine projected positions (using any now or hereafter known methods). In an example embodiments, the complementary controller may determine the location by tracking changes in the AV position over time based on data received from, for example, an ITM sensor and a wheel speed sensor. It should be noted that the complementary controller may not have access to a local map and cannot perform localization based on map coordinates. In some implementations, for determining a current pose of the AV, the complementary controller may analyze pose information (e.g., received from a pose interface that subscribes to real-time pose information from the primary controller) at successive time points, and compute a delta pose using, for example, SE3 transformation that represents how the AV moved between two time stamps.

Optionally, the complementary controller may also predict future locations, trajectories, and/or actions of one or more objects detected in the ROII based, for example, the perception information (e.g., the state data for each object), the information relating to the localization of the AV, the sensor data, and/or any other data that describes the past and/or current state of the objects, the AV, the surrounding environment, and/or their relationship(s), using any now or hereafter known methods.

If a collision is predicted between the object in the ROII and the AV (508: YES), the complementary controller may initiate a collision mitigation action at 510. Example of a collision mitigation action may include causing the AVP to execute maximum braking to bring the AV to a complete stop immediately and safely before it collides with the object in the ROII, causing the AVP to steer the AV away from the ROII and/or the object in addition to the braking action, causing the AVP to execute a lane change away from the object, or the like. As discussed above, the ROII is determined such that the AV can come to a complete stop upon application of emergency braking before it enters the ROIL Therefore, there is always a gap (e.g., about 2-4 meters, about 2-5 meters, etc.) between the ROII and the AV to allow for a minimum stopping distance required for the AV traveling at certain speeds.

If a collision is not predicted between the object in the ROII and the AV (508: NO), the complementary controller may continue monitoring the fallback monitoring region (i.e., step 604).

In certain embodiments, the complementary controller may only consider objects that have a certain weight, dimensions, density, mass, or the like as being relevant for the purposes of initiating collision mitigation, and disregard objects detected in the fallback monitoring region that do not have the required characteristics (e.g., plastic bumpers, cinder blocks, semi tire treads, small construction debris, or the like).

Referring back to FIG. 3, the failover subsystem 162 of the complementary controller 116 may receive one or more failover trajectories from the primary controller 112, and initiate a failover stop action to bring the AV 101 to a safe stop using one of the failover trajectories, upon occurrence of a triggering event.

Figure 6:
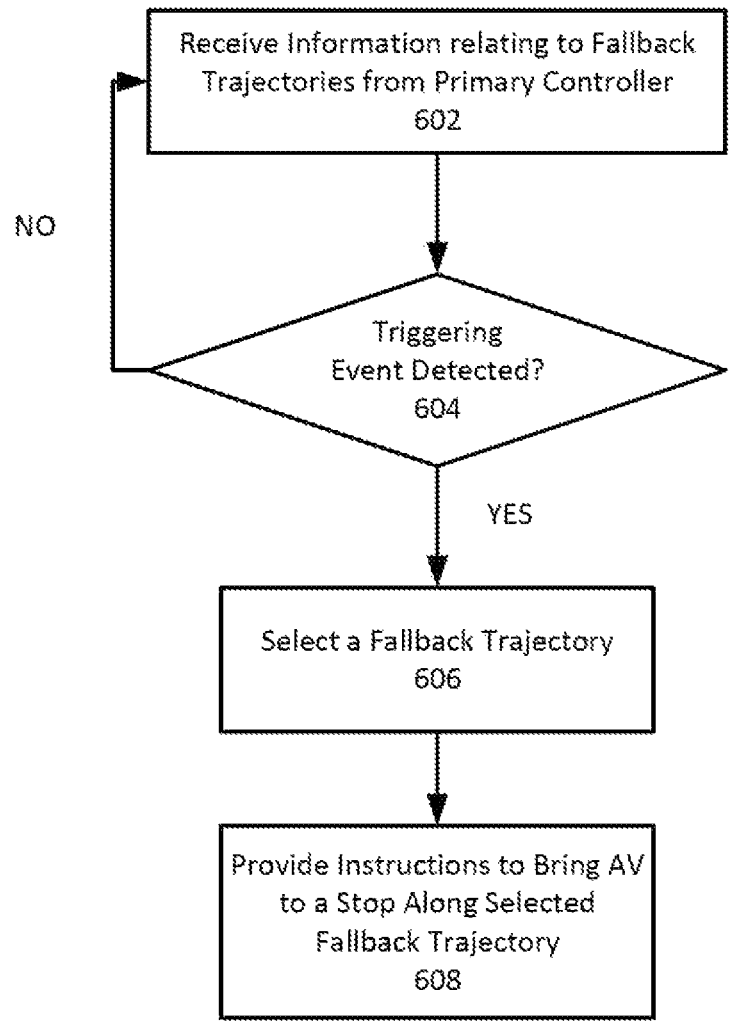
FIG. 6 is a flowchart illustrating an example method for execution of a failover stop action by a complementary controller.

FIG. 6 is a flowchart illustrating an example method for execution of a failover stop action by a complementary controller. At 602, the complementary controller may receive information relating to one or more failsafe trajectories from the primary controller. As discussed, the complementary controller 116 has no knowledge of the environment of the AV outside the fallback monitoring region. For example, complementary controller 116 does not know the lane the AV is traveling in, information about objects outside the fallback monitoring region, clutter outside the fallback monitoring region, etc. As such, the primary controller 112 is better equipped to determine the failsafe trajectories that can safely bring the AV to zero speed within the fallback monitoring region. The failsafe trajectories may be determined based on factors such as, without limitation, the speed/acceleration of the AV, constraints relating to deceleration of the AV, heading or orientation of the AV, the number and types of objects in the environment of the AV, speed/acceleration/heading/orientation of such objects, predictions relating to one or more future actions of the objects, environmental conditions (e.g., wet roads, approaching an intersection or a traffic light, low visibility, etc.), characteristics of the planned motion path (e.g., approaching a turn signal, lane change, intersection, etc.), a rule set providing different allowable deceleration ranges for various scenarios, distance to edge of driveable surface, distance to opposing traffic lane, distance from planned path of the AV, or the like. It should be noted that the failsafe trajectories are determined to be always along the planned motion path of the AV. In other words, the AV may not switch planned paths during a failover stop action (since the complementary controller only monitors the fallback monitoring region along the planned path).

Depending on the state of the AV, the following examples provide some example generation criteria for the failsafe trajectory. If an object is closely following behind the AV, the primary controller may generate failsafe trajectories that have a deceleration rate that falls within the allowable deceleration range for such a scenario to avoid the object from colliding with the back of the AV (e.g., about 0.28-0.32 g or about 0.3 g average deceleration from 45 mph). In another example, if an object is detected within the fallback monitoring region, the primary controller may generate failsafe trajectories that allow the AV to come to a stop before colliding with the object and/or at least at a threshold buffer distance from the object. If the AV is approaching an area of occlusion, the primary controller may generate failsafe trajectories that allow the AV to come to a stop before a region of the area of occlusion where an object might appear and/or at least at a threshold buffer distance from the region. If the AV is approaching an intersection with a traffic signal, the primary controller may generate failsafe trajectories that allows the AV to come to a stop before a crosswalk/implied crosswalk and/or at least at a threshold buffer distance from the crosswalk. In another scenario, if the AV is making an unprotected Left/Right/Straight maneuver, the primary controller may generate failsafe trajectories that have the maximum deceleration (e.g., maximum braking). If the AV is merging into traffic, the primary controller may generate failsafe trajectories that allow the AV to stop prior to entering the lane of conflict. If the AV is executing a high angle turn or a U-turn, the primary controller may generate failsafe trajectories that allows the AV to stop along any of the failsafe trajectories. If the AV is making a lane change without any occlusions, the primary controller may generate failsafe trajectories that allow the AV to stop with a deceleration rate within a defined range (e.g., about 0.28-0.32 g or about 0.3 g average deceleration from 45 mph). However, AV is making a lane change with an occlusion, the primary controller may generate failsafe trajectories that allow the AV to come to a stop before a region of the area of occlusion where an object might appear and/or at least at a threshold buffer distance from the region. Similarly, if there is a vehicle in front of the AV changing lanes that may cause late reveal of an object, the primary controller may generate failsafe trajectories that allow the AV to come to a stop before a region of the area of occlusion where an object might appear and/or at least at a threshold buffer distance from the The primary controller continuously transmits the failsafe trajectories to the complementary controller for use (with or without occurrence of a triggering event).

In certain embodiments, the primary controller may also assign a score, rank, or other quantitative metrics, to each the failsafe trajectories. For example, the failsafe trajectory that requires maximum deceleration may be assigned a lowest risk score, and the other failsafe trajectories may be assigned risk scores based on the deceleration rates. Similarly, the failsafe trajectories may be ranked based on the distance to stop location from the current location of the AV, amount of lateral steering required, distance from other objects, or the like.

Figure 7:
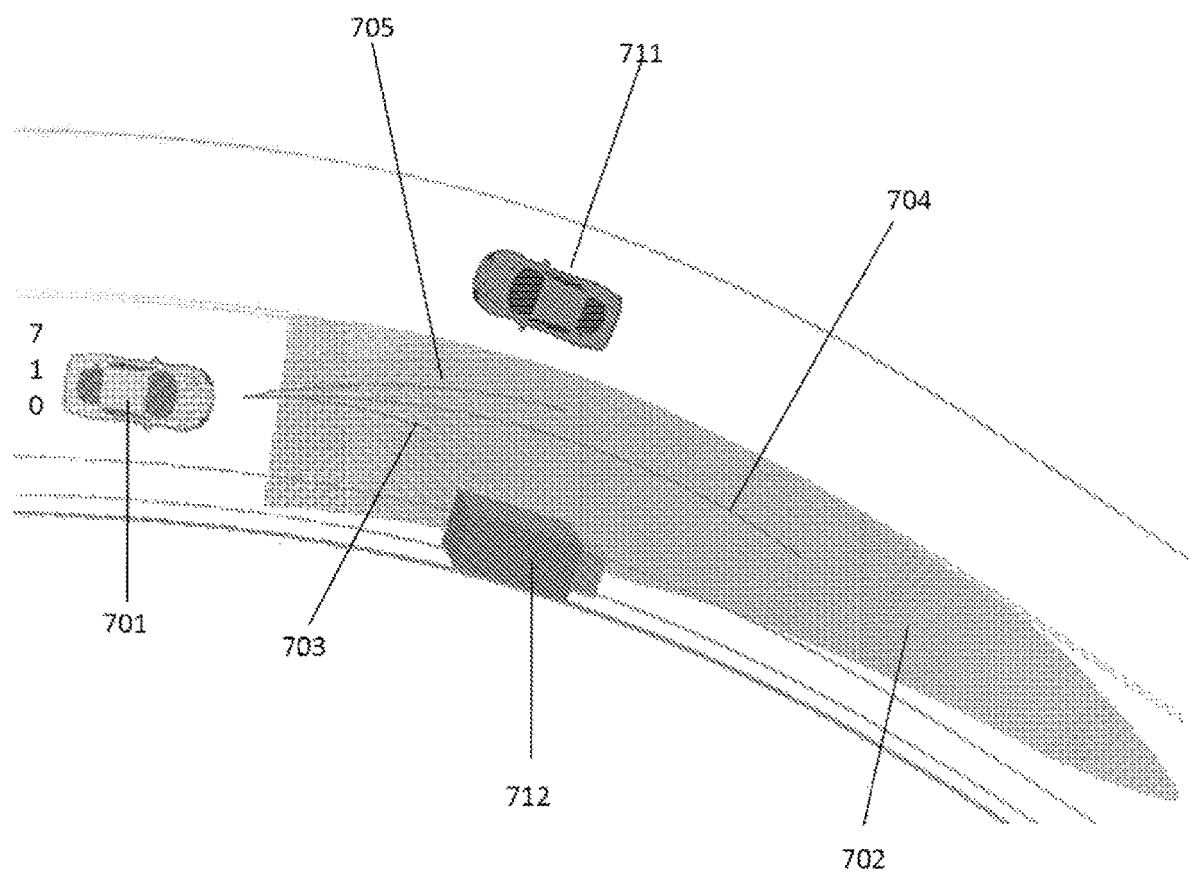
FIG. 7 is a schematic illustration of example failsafe trajectories generated by the primary controller.

FIG. 7 is a schematic illustration of example failsafe trajectories generated the primary controller for an AV 701 in its current position. As shown, while the AV 701 is moving in lane 710, the primary controller generates a fallback monitoring region 702 that includes one or more failsafe trajectories 703, 704, and 705. The AV 701 can safely decelerate to a stop by following one of the failsafe trajectories 703, 704, and 705 without colliding with objects in the environment of the AV (e.g., vehicles 711 and 712). The failsafe trajectories 703, 704, and 705 are typically within the lane the AV 701 is traveling in (lane 710). However, in certain scenarios, the failsafe trajectories may traverse other lanes such as when the failover stop action is triggered during a lane change, when the AV traversing an intersection, or the like; such that the AV may follow a failsafe trajectory to come to a stop in the target lane.

The failsafe trajectories 703, 704, and 705 may have different properties such as, without limitation, deceleration rates, final stop location, lateral steering commands, or the like.

Referring back to FIG. 6, may detect occurrence of a triggering event at 604. Examples of the triggering event may include, without limitation, loss of communication between the primary controller and one or more sensors of the primary sensor system such that the primary controller cannot receive sensor data, power failure of the primary controller, internal faults in the primary controller (e.g., main processor failure, PCI switch failure, Ethernet switch failure), loss of communication between the primary controller and the AVP, loss of power to the AVP, primary controller breakdown, AVP breakdown, or the like. It should be noted that the triggering event may be associated with a scenario when the primary controller is unable to bring the AV to a safe stop and/or safely navigate the AV.

In some embodiments, the complementary controller 116 may determine that a triggering event has occurred based on information received from, for example, the primary diagnostics subsystem 126 of the primary controller 112 and/or from the AVP 113. Alternatively and/or additionally, the complementary controller 116 may include its own secondary diagnostics subsystem 163 configured to collect and analyze information relating to the health and functioning of the primary controller 112, the AVP 113, and/or the complementary controller 116 itself.

Figure 8:
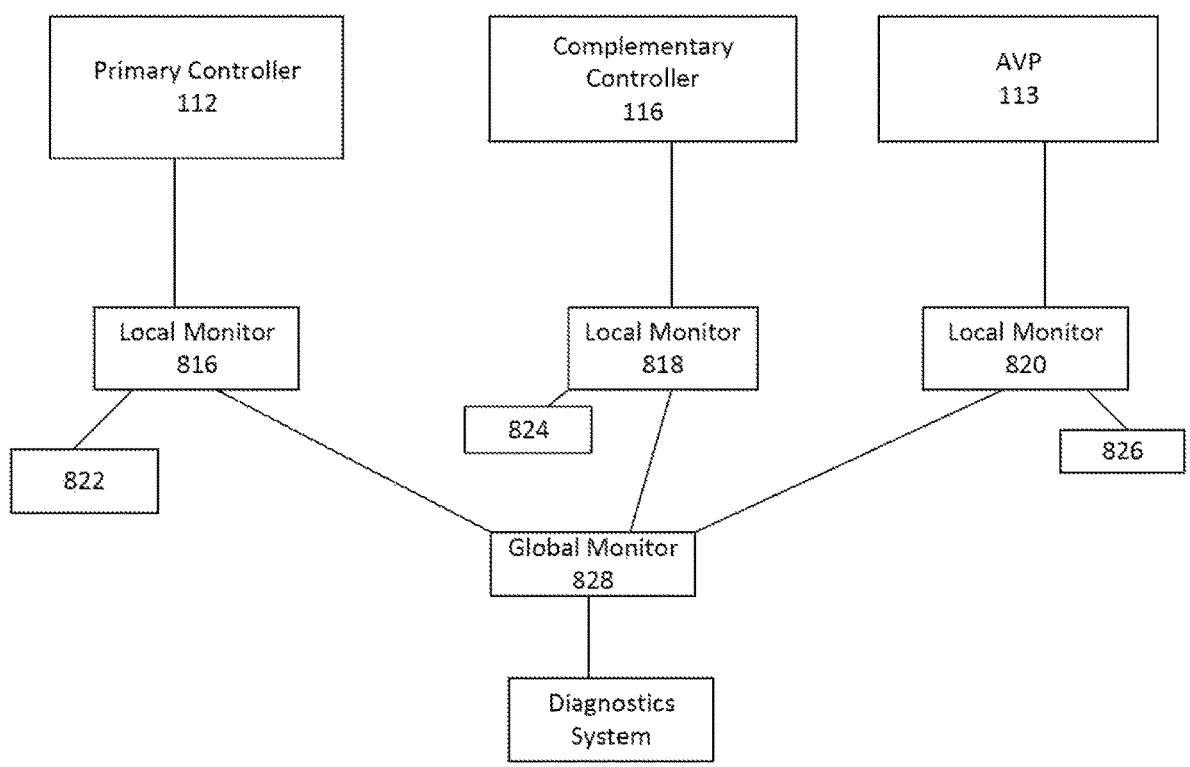
FIG. 8 is a block diagram illustrating local and global monitors for performing diagnostics.

As illustrated in FIG. 8, the subsystems of the primary controller 112, the complementary controller 116, and/or the AVP 113 may be in communication with a local monitor 816, 818, 820. A local monitor 816, 818, 820 may be implemented using hardware, software or a combination of hardware. For instance, a local monitor 816, 818, 820 may be implemented as part of a microcontroller. A local monitor 816, 818, 820 may include one or more of a register or data store for temporarily storing data, a comparator for comparing data, programmed circuitry for performing one or more cryptographic operations and/or the like. A local monitor 816, 818, 820 may receive data pertaining to one or more functions executed by a subsystem, and may use this information to verify at least a portion of the execution flow to which the function(s) pertain.

FIG. 8 also illustrates example non-volatile memory (NVM) 822, 824, 826, which may be used to store information, as discussed in more detail throughout this disclosure. In various embodiments, an NVM 822, 824, 826 may include a master hash table. A master hash table refers to a data structure that stores encrypted and/or encoded information associated with one or more functions.

As shown in FIG. 8, a monitoring system 800 may include a global monitor 828. A global monitor 828 may be implemented using hardware, software or a combination of hardware. For instance, a global monitor 828 may be implemented as part of a microcontroller. A global monitor 828 may include one or more of a register or data store for temporarily storing data, a comparator for comparing data, programmed circuitry for performing one or more cryptographic operations and/or the like. A global monitor 828 may be in communication with one or more of the local monitors 816, 818, 820. Local monitors 816, 818, 820 may send to a global monitor 828 information pertaining to functions or tasks executed by one or more of their associated subsystems. The global monitor 828 may use this information to monitor, detect or track patterns at a higher system level. In other words, a local monitor 816, 818, 820 may detect faults or anomalies at a local level, while a global monitor 828 may detect system level faults over a period of time. In various embodiments, a global monitor 828 may be in communication with a diagnostics system such as the primary diagnostics subsystem 127 and/or the secondary diagnostics subsystem 163.

It is understood that additional or alternate subsystems, along with additional or fewer local monitors, NVMs and/or configurations of each may be used within the scope of this disclosure.

Referring back to FIG. 6, upon detection of a triggering event (604: YES), the complementary controller may select (606) one of the failsafe trajectories and provide instructions to the AVP (608) to bring the AV to a stop along selected failsafe trajectory. If a triggering event is not detected (604: NO), the complementary controller may not take any action.

The complementary controller may select a failsafe trajectory based on factors such as, without limitation, perception and prediction information relating to objects in the fallback monitoring region as determined by the complementary controller (e.g., discard trajectories that have or will have objects in the path), time elapsed since the receipt of the failsafe trajectories from the primary controller (e.g., discard trajectories that have not been updated within a threshold time period), scores assigned to the failsafe trajectories by the primary controller (e.g., choose the trajectory that is least risky, moderately risky, etc.), type of the triggering event (e.g., certain triggering events may require maximum deceleration allowed to stop—for example, if another vehicle pulls out suddenly in front of the AV, the selected trajectory that bring the AV to a stop before colliding with the vehicle), or the like.

If an object ever appears in the failsafe trajectory the AV is following in a failover action, the complementary controller may cause the AV to initiate collision mitigation even before the object enters the ROII (using the principles discussed above with respect to FIG. 5 but using the failsafe trajectory instead of the ROII).

In some embodiments, once a collision mitigation action or a failover stop action is initiated by the complementary controller 116, the primary controller 112 may not resume normal operations of the AV without human intervention.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the AVP of the vehicle. However, the embodiments are not limited to this arrangement, as in various embodiments the analysis, decision making and or operational control may be handled in full or in part by other computing devices that are in electronic communication with the vehicle's on-board controller and/or AVP. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

It should be noted that while the above description describes execution of the collision mitigation action and the execution of a failover stop action by the complementary controller as distinct processes, the disclosure is not so limiting. Some or all of the steps for execution of the collision mitigation action and the execution of a failover stop action may be performed by the complementary controller simultaneously and/or contemporaneously depending on the object and/or its current/predicted behavior in the environment of the AV.

Figure 9:
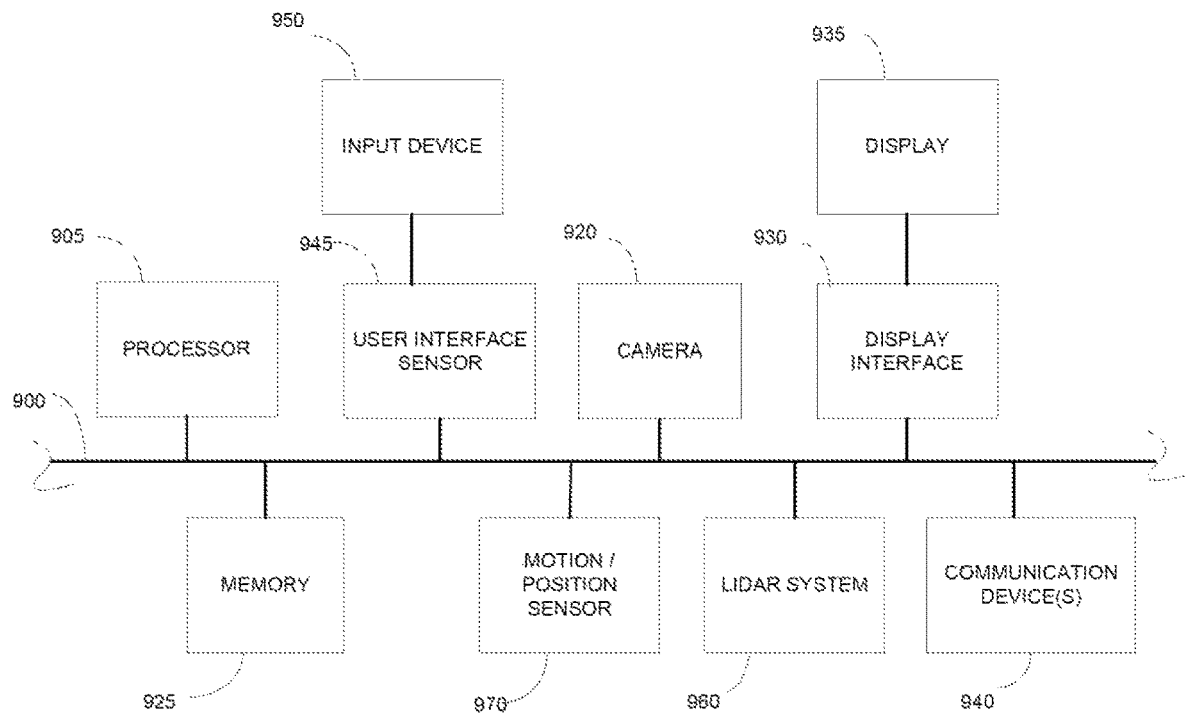
FIG. 9 is a block diagram that illustrates various elements of a possible electronic subsystem of an AV and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "controller", "primary controller", "complementary controller", and "platform" refer to an electronic device that is configured to execute commands to control one or more other devices or device components.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an AV, an on-board diagnostics system.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, uncertain road users may include pedestrians, cyclists, individuals on roller skates, rollerblades, wheelchairs, individuals, or people in general, etc.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for operating an autonomous vehicle (AV), the method comprising:
by a primary controller:
receiving a first set of sensor data from a primary sensor system and a second set of sensor data from a secondary sensor system,
providing a first plurality of instructions to an AV platform for operating the AV in an autonomous mode along a planned path based on the first set of sensor data and the second set of sensor data, and
providing information to a complementary controller, the information comprising at least a fallback monitoring region determined based on a speed of the AV a deceleration capability of the AV associated with a road condition, the fallback monitoring region includes a region of inevitable intersection (ROII) immediately before the AV and a region of likely intersection (ROLI) father from the AV after the ROII;
by the complementary controller having less processing power than the primary controller:
receiving the second set of sensor data from the secondary sensor system, the second set of sensor data corresponding to the fallback monitoring region,
analyzing the received second set of sensor data to determine whether a collision is imminent with an object as the AV is traveling at a first speed when the object enters the ROII, and
upon determining that the collision is imminent with the object in the ROII, causing the AV platform to initiate a collision mitigation action; and
by the primary controller:
analyzing the second set of sensor data to detect presence of the object within the ROLI before the object enters the ROII, and
providing instructions to the AV platform for decelerating the AV such that the vehicle is traveling at a second speed slower than the first speed when the object enters the ROII, and the initiation of the collision mitigation action by the complementary controller is prevented or delayed.

2. The method of claim 1, wherein:
analyzing, by the complementary controller, the received second set of sensor data to determine whether the collision is imminent with the object in the fallback monitoring region comprises at least one of the following: determining that the object is present within the ROII or identifying intersections between projected positions of the AV and the object in the ROII at various points of time.

3. The method of claim 2, wherein the ROII is calculated as a union of the AV's footprint over a left highest possible curvature trajectory and a right highest possible curvature trajectory at a current speed of the AV.

4. The method of claim 1, wherein the collision mitigation action comprises a maximum braking action to bring the AV to a stop before it can collide with the object.

5. The method of claim 1, wherein:
providing, by the primary controller, the first plurality of instructions to the AV platform for operating the AV in the autonomous mode along the planned path comprises providing the first plurality of instructions to the AV platform via the complementary controller; and
upon determining that the collision is imminent with the object in the fallback monitoring region, by the complementary controller:
stopping provision of the first plurality of instructions, received from the primary controller, to the AV platform, and
providing a second plurality of instructions to cause the AV platform to initiate the collision mitigation action.

6. The method of claim 1, further comprising:
by the primary controller:
determine a rate for decelerating the AV based on at least one of: a speed or acceleration of the object, a heading or orientation of the object, or an environmental condition.

7. A system for controlling operations of an autonomous vehicle (AV), the system comprising:
an AV comprising:
a primary sensor system,
a secondary sensor system,
a primary controller, and
a complementary controller;
the primary controller being configured to:
receive a first set of sensor data from the primary sensor system and a second set of sensor data from the secondary sensor system,
provide a first plurality of instructions to an AV platform for operating the AV in an autonomous mode along a planned path based on the first set of sensor data and the second set of sensor data, and
provide information to the complementary controller, the information comprising at least a fallback monitoring region determined based on a speed of the AV a deceleration capability of the AV, the fallback monitoring region includes a region of inevitable intersection (ROII) immediately before the AV; and
the secondary controller having less processing power than the primary controller, the secondary controller being configured to:
receive the second set of sensor data from the secondary sensor system, the second set of sensor data corresponding to the fallback monitoring region,
analyze the received second set of sensor data to determine whether a collision is imminent with an object detected in the ROII, and
upon determining that the collision is imminent with the object in the ROII, cause the AV platform to initiate a collision mitigation action.

* * * * *